Feb. 7, 1950     A. F. HASBROOK     2,496,392
APPARATUS FOR RECORDING TIME INTERVALS
Filed Sept. 27, 1948     2 Sheets-Sheet 1
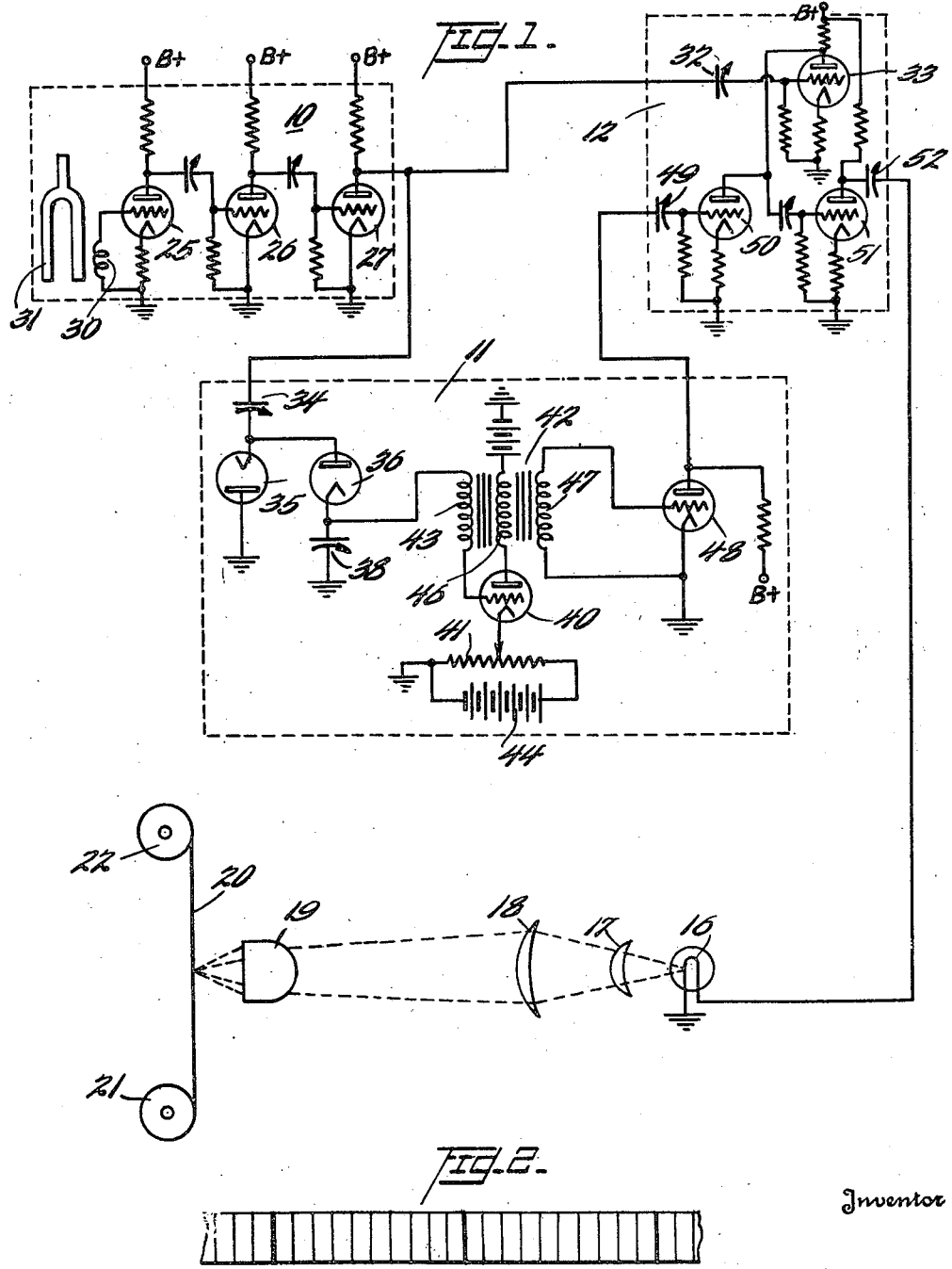
Inventor
Arthur F. Hasbrook,
By Watson, Cole, Grindle & Watson
ATTORNEYS Feb. 7, 1950     A. F. HASBROOK     2,496,392
APPARATUS FOR RECORDING TIME INTERVALS
Filed Sept. 27, 1948     2 Sheets-Sheet 2
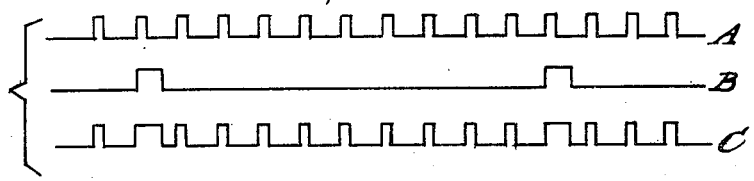
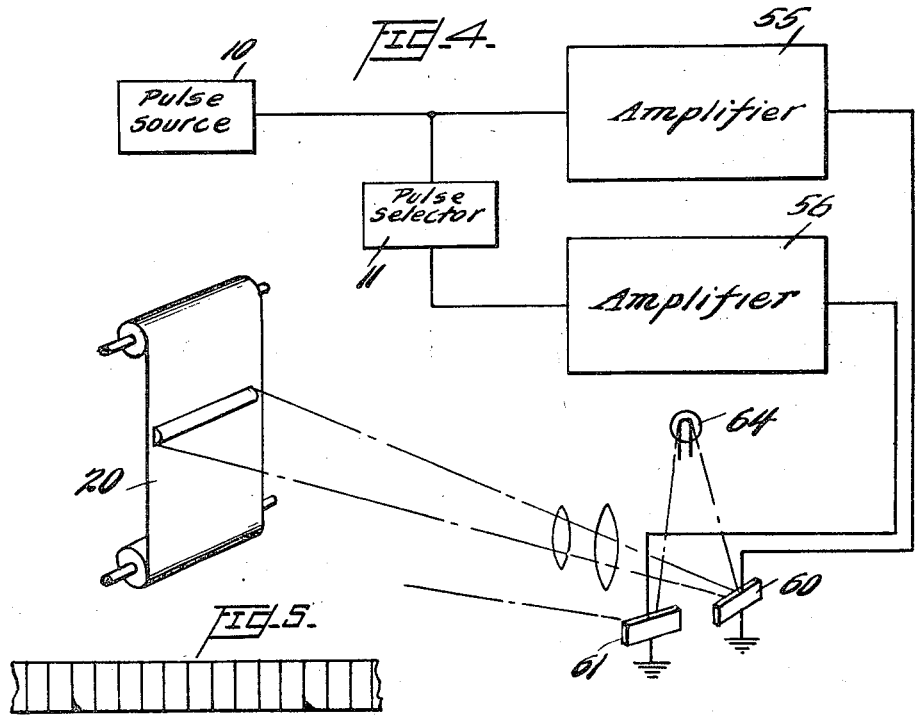
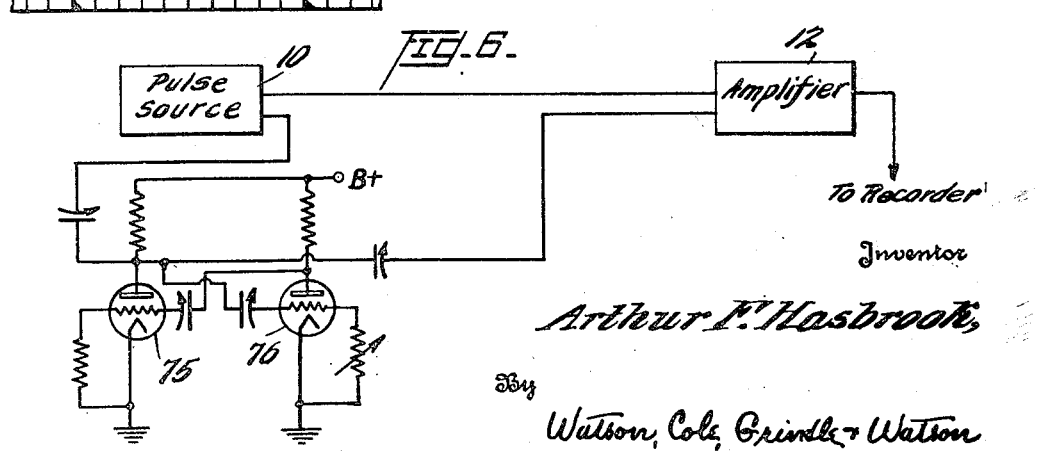
Inventor
Arthur F. Hasbrook,
By Watson, Cole, Grindle & Watson
ATTORNEYS Patented Feb. 7, 1950

2,496,392

UNITED STATES PATENT OFFICE 2,496,392

APPARATUS FOR RECORDING TIME INTERVALS

Arthur F. Hasbrook, San Antonio, Tex., assignor to Olive S. Petty, San Antonio, Tex.

Application September 27, 1948, Serial No. 51,424

6 Claims. (Cl. 346—33)

This invention relates to improvements in a system for marking timing indicia on records such as seismograms and the like, and has for its object the provisions of apparatus employing electronic elements whereby unusual accuracy of the timing of a sequence of events, such as the arrival of a train of seismic waves, may readily be attained without the aid of mechanical devices, such as the rotating wheels heretofore commonly employed for this purpose.

In order to facilitate the interpretation of records of this character, it is customary to employ devices for registering on the record sheet or seismogram a series of equally spaced timing lines, and to mark distinctively only certain of these lines, for instance, every fifth or every tenth line, for easy identification. While such distinctive marking is readily provided in mechanical systems employing synchronous motors to effect periodic interruption of a light beam, the necessary accuracy for the more delicate and exacting measurements cannot be so achieved. It is a feature of the instant invention that marking is effected by electronic circuits, both in the marking of the basic unit intervals and in the distinctive marking of multiple intervals.

More specifically, it is an object of the invention to provide a system for marking timing indicia on seismic records and the like by recording devices which are responsive to electrical signal impulses, wherein the signals corresponding to the unit intervals of time are derived from a pulse source employing electronic elements, and wherein the signals for effecting distinctive marking of longer intervals are derived from the same pulse source by conversion to a sub-multiple frequency, for example by a frequency divider.

Further objects and features of the invention will be apparent from the following description taken in connection with the accompanying drawings, in which Figure 1 is a wiring diagram of a circuit for supplying electrical impulses in accordance with the principles of the invention, shown in conjunction with a conventional optical system for recording indicia corresponding to such impulses;

Figure 2 illustrates a record such as may be produced with the use of apparatus shown in Figure 1;

Figure 3 represents graphically, in the order named, a signal representing the basic unit interval of time, a signal representing a multiple unit interval, and a signal resulting from the combination of the basic and multiple interval signals;

Figure 4 shows a system generally similar to that employed in Figure 1 but in which no combination of electrical impulses as such is effected;

Figure 5 illustrates a record such as may be produced by the use of the apparatus shown in Figure 4; and Figure 6 illustrates a modification of a portion of the circuit shown in Figure 1.

To facilitate an understanding of the invention, reference is made hereinafter to the several embodiments thereof illustrated in the drawing and specific language is employed to describe the same. It will nevertheless be understood that no limitation of the invention is thereby intended, such further modifications and alterations being contemplated as fall within the scope and spirit of the appended claims.

In Fig. 1 is represented schematically a pulse source 10, a pulse selector in the form of a single phase blocking oscillator 11 energized from said pulse source 10, and an amplifier 12 in which signal energy from the pulse source and the blocking oscillator are combined substantially in multiple phase relation. The combined energy is fed to an optical system comprising a light source 16, lenses 17, 18, and a prism 19, whereby light emanating from source 16 is projected as a transverse line on a sensitized record sheet 20 while it is fed at a uniform rate from roller 21 to roller 22. By appropriate selection of the light source, which may be a gas tube, light pulses of $1/1000$ second duration may be projected at a rate of 100 per second, such pulses being useful in seismic recording. During the feeding of the sheet 20 and concurrently with the registering of timing lines thereon, a sequence of events, for instance the arrival of seismic waves at one or more seismometers, may also be recorded in the conventional manner, not illustrated. It will be appeciated that the details of the optical system form per se no part of the invention; other types of recording devices may be used, for instance devices employing energy of a frequency falling outside the visible spectrum.

To illustrate the pulse source 10 I have shown a resistance coupled amplifier comprising thermionic valves 25, 26, 27 arranged in cascade, the control grid of the first valve 25 of the series being energized from a winding 30 in which oscillatory energy is induced by a vibrating tuning fork, or the like, which may be stimulated in any convenient manner. It will be appreciated that the details of this pulse oscillator are not critical in the practice of the invention, and that any oscillator delivering energy at the desired frequency may be employed, for instance a sine wave quartz crystal oscillator, the pulse being suitably shaped by the use of a grid limiter or other wave shaping circuit, for example to the shape shown at A in Fig. 3. The output of the pulse source is supplied in part to amplifier 12, in which it may be impressed on the control grid of valve 33 through condenser 32, and in part to oscillator 11, where it may be applied to the cathode of valve 35 through condenser 34.

During that portion of the cycle represented by the leading edge of the pulse, the anode of valve 36, which is fed from condenser 34, becomes positively charged, and the resultant current flow through valve 36 puts a charge on condenser 38, which is connected to the cathode of the valve. During that portion of the cycle represented by the trailing edge of the pulse, the anode of valve 35 becomes positive, and current flows through the valve to discharge condenser 34, in preparation for the arrival of the next pulse. Thus each pulse increases the charge on condenser 38, and this charge is applied to the control grid of valve 40 through winding 43 of oscillation transformer 42. Valve 40 is initially biased beyond cut-off by adjustment of potentiometer 41 across bias battery 44, and by proper selection of the bias voltage, a predetermined number of pulses from source 10 may be caused to trigger valve 40. When valve 40 fires, the anode current flowing in winding 46 induces current flow in winding 47 of transformer 42, and the resultant pulse is supplied to the control grid of valve 48 and thence through condenser 49 to the control grid of valve 50 of amplifier 12. The output of valve 33, representing the basic unit pulse, and the output of valve 50, representing the multiple unit pulse are combined and transmitted to resistance coupled amplifier valve 51 and thence through condenser 52 to light source 16, the combination being preferably effected substantially in multiple phase, so that the combined pulses overlap.

Concurrently with conduction through valve 40, condenser 38 is discharged so that the original negative bias on grid of valve 40 is re-established, oscillation being thereby limited to a single cycle. By appropriate selection of the characteristics of transformer 42, the output pulse from blocking oscillator 11 can be made several times longer than the pulse from source 10, and sensitized sheet 20 can thus be marked in the manner shown in Fig. 2, in which, by suitable frequency division in oscillator 11, every tenth line is considerably strengthened for identification. By proper adjustment of potentiometer 41, distinctive marking of any other multiple line may be effected, and by combining the basic and multiple pulses in other than multiple phase relation, the multiple line may be registered elsewhere than in overlapping relation with the unit line.

In Figure 3 is represented a preferred method of combining the impulses of higher and lower frequency, curve A representing the impulses derived from pulse source 10, B representing the pulses derived from oscillator 11, and C representing the combined signal energy, every tenth pulse being substantially longer to effect the marking of a heavier line on a sensitized sheet.

In Figure 4 is illustrated an arrangement which may be essentially similar to that of Figure 1 as regards the pulse source and the pulse selector, except that the signals are not combined but are passed through separate amplifiers 55, 56, the outputs of the two amplifiers being transmitted respectively to separate vibrating mirrors 60 and 61, as schematically shown on the drawing, these mirrors serving to reflect light from a constant source 64 through suitable lens systems onto the sensitized sheet 20. It will be appreciated that in this system the unit and multiple pulses are not combined as such, but are appropriately recorded on the sensitized sheet, for instance in the manner shown in Figure 5 in which multiple unit lines are distinctively marked by registering a beam from mirror 61 with every tenth line projected by mirror 60.

As hereinbefore indicated, the details of the pulse selector are not important. Thus while I prefer to employ, as giving greater accuracy, a blocking oscillator of the type shown in Figure 1, other types of frequency divider may be used. One such arrangement is represented in Figure 6, in which energy from pulse source 10 is supplied to a multi-vibrator circuit comprisisg valves 75 and 76, the output of each valve being applied to the control grid of the other, and the circuit constants being selected in the known manner so as to produce a signal of a frequency which is a sub-multiple of the frequency of the pulse source 10, both signals being fed to and combined in amplifier 12 for transmission to recording devices, or separately amplified as in Figure 4 for transmission to separate recording means. In some instances it may be desirable to employ a plurality of multi-vibrator circuits in series. Thus two such circuits may be employed, the first reducing the frequency of the original pulse to one-fifth, and the second dividing the output of the first in half, so that the over-all reduction is one-tenth of the original frequency.

Having thus described the invention, what is claimed as new and desired to be secured by Letters Patent is:

1. In a system for marking timing indicia on seismic records and the like, the combination with devices responsive to electrical signal impulses for recording time lines on a record at intervals determined by the period of said impulses, of a pulse source for generating a first series of electrical impulses at a predetermined frequency, electronic means responsive to said first series of impulses for generating a second series of impulses at a frequency which is a sub-multiple of the frequency of said first series of impulses, and means impressing on said recording devices energy representative of both said first and second series of impulses to effect distinctive marking of time lines at intervals corresponding to the intervals between said second series of impulses.

2. In a system for marking timing indicia on seismic records and the like, the combination with devices responsive to electrical signal impulses for recording time lines on a record at intervals determined by the period of said impulses, of a pulse source for generating a first series of electrical impulses at a predetermined frequency, electronic means responsive to said first series of impulses for generating a second series of impulses at a frequency which is a sub-multiple of the frequency of said first series of impulses, and means combining said first and second series of impulses in multiple phase and impressing the resulting combined signal energy on said recording devices to effect distinctive marking of time lines at intervals corresponding to the intervals between said second series of impulses.

3. In a system for marking timing indicia on a sensitized record, the combination with devices responsive to electrical signal impulses for recording time lines on a record at intervals determined by the period of said impulses, said devices including a source of radiation and means projecting radiation from said source onto said record, of an electronic pulse source for generating a first series of electrical impulses at a predetermined frequency, electronic means responsive to said first series of impulses for generating a second series of impulses at a frequency which is a sub-multiple of the frequency of said first series of impulses, and means impressing on said source of radiation energy representative of both said first and second series of impulses to effect distinctive marking of time lines at intervals corresponding to the intervals between said second series of impulses.

4. In a system for marking timing indicia on seismic records and the like, the combination with devices responsive to electrical signal impulses for recording time lines on a record at intervals determined by the period of said impulses, of an electronic pulse source for generating a first series of electrical impulses at a predetermined frequency, electronic means responsive to said first series of impulses for generating a second series of impulses at a frequency which is a sub-multiple of the frequency of said first series of impulses, said means comprising a relaxation oscillator, and means impressing on said recording devices energy representative of both said first and second series of impulses to effect distinctive marking of time lines at intervals corresponding to the intervals between said second series of impulses.

5. In a system for marking timing indicia on seismic records and the like, the combination with devices responsive to electrical signal impulses for recording time lines on a record at intervals determined by the period of said impulses, of an electronic pulse source for generating a first series of electrical impulses at a predetermined frequency, a multivibrator circuit energized by said first series of impulses for generating a second series of impulses at a frequency which is a sub-multiple of the frequency of said first series of impulses, and means impressing on said recording devices energy representative of both said first and second series of impulses to effect distinctive marking of time lines at intervals corresponding to the intervals between said second series of impulses.

6. In a system for marking timing indicia on seismic records and the like, the combination with devices responsive to electrical signal impulses for recording time lines on a record at intervals determined by the period of said impulses, of an electronic pulse source for generating a first series of electrical impulses at a predetermined frequency, electronic means responsive to said first series of impulses for generating a second series of impulses at a frequency which is a sub-multiple of the frequency of said first series of impulses, said means comprising a single phase blocking oscillator, and means impressing on said recording devices energy representative of both said first and second series of impulses to effect distinctive marking of time lines at intervals corresponding to the intervals between said second series of impulses.

ARTHUR F. HASBROOK.

REFERENCES CITED

The following references are of record in the file of this patent:

UNITED STATES PATENTS

| Number | Name | Date |
| --- | --- | --- |
| 2,424,622 | McClure | July 29, 1947 |
| 2,432,158 | Hulst, Jr., et al. | Dec. 9, 1947 |
| 2,438,341 | Kizaur | Mar. 23, 1948 |
| 2,455,265 | Norgaard | Nov. 30, 1948 |
| 2,468,754 | Hings | May 3, 1949 |